(12) United States Patent
Martin et al.

(10) Patent No.: US 9,105,125 B2
(45) Date of Patent: Aug. 11, 2015

(54) LOAD BALANCING FOR OPTIMAL TESSELLATION PERFORMANCE

(71) Applicant: Advanced Micro Devices, Inc., Sunnyvale, CA (US)

(72) Inventors: Todd E. Martin, Orlando, FL (US); Mangesh Nijasure, Orlando, FL (US); Jason Carroll, Oviedo, FL (US); Randy W. Ramsey, Oviedo, FL (US); Brian A. Buchner, Oviedo, FL (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 117 days.

(21) Appl. No.: 13/705,479

(22) Filed: Dec. 5, 2012

(65) Prior Publication Data

US 2014/0152675 A1 Jun. 5, 2014

(51) Int. Cl.
*G06T 15/00* (2011.01)
*G09G 5/36* (2006.01)
*G06T 17/20* (2006.01)

(52) U.S. Cl.
CPC .............. *G06T 15/005* (2013.01); *G06T 17/20* (2013.01); *G09G 5/363* (2013.01); *G06T 2210/52* (2013.01); *G09G 2360/06* (2013.01)

(58) Field of Classification Search
CPC ... G06T 15/005; G09G 2360/06; G09G 5/363
USPC ........... 345/423, 426, 501, 502, 505; 718/105
See application file for complete search history.

(56) References Cited

U.S. PATENT DOCUMENTS

| | | | |
|---|---|---|---|
| 7,385,607 B2 * | 6/2008 | Bastos et al. ................. | 345/502 |
| 7,564,456 B1 * | 7/2009 | Lindholm et al. ............ | 345/426 |
| 8,675,002 B1 * | 3/2014 | Andonieh et al. ............ | 345/522 |
| 2009/0303245 A1 * | 12/2009 | Soupikov et al. ............ | 345/582 |

* cited by examiner

*Primary Examiner* — Joni Richer
(74) *Attorney, Agent, or Firm* — Volpe and Koenig, P.C.

(57) ABSTRACT

A system, method and a computer-readable medium for load balancing patch processing pre-tessellation are provided. The patches for drawing objects on a display screen are distributed to shader engines for parallel processing. Each shader engine generates tessellation factors for a patch, wherein a value of generated tessellation factors for the patch is unknown prior to distribution. The patches are redistributed to the shader engines pre-tessellation to load balance the shader engines for processing the patches based on the value of tessellation factors in each patch.

23 Claims, 6 Drawing Sheets

FIG. 4

LOAD BALANCING FOR OPTIMAL TESSELLATION PERFORMANCE

BACKGROUND

1. Field of the Invention

The embodiments are generally directed to tessellation in a graphics pipeline. More particularly, the embodiments are directed to balancing a workload in the graphics pipeline pre-tessellation.

2. Background Art

Display images comprise thousands of dots, where each dot represents one of thousands or millions of colors. These dots are known as picture elements, or "pixels". Each pixel has multiple attributes, such as, color and texture attributes. Those attributes are manipulated and processed before being rendered on a display screen of an electronic device.

Pixels form graphical objects. Example graphical objects include points, lines, polygons, and three-dimensional (3D) solid objects. Points, lines, and polygons represent rendering primitives which are the basis for most rendering instructions. More complex structures, such as 3D objects, are formed from a combination or a mesh of such primitives. To display a particular scene, the visible primitives associated with the scene are drawn individually by determining pixels that fall within the edges of the primitives and manipulating the attributes that correspond to each of those pixels.

Because there are thousands, if not millions of primitives, the inefficient processing of primitives reduces system performance when complex images are rendered on a display screen. Conventional graphics pipelines process generated primitives from patches that include instructions for displaying pixels on a display screen. The patches, depending on size, are divided or combined into prim groups. Each prim group is sent to a shader engine for processing. A shader engine performs tessellation on each patch, and converts control points in each patch to multiple primitives. The number of primitives in each patch depends on a tessellation factor. A tessellation factor may be greater for patches processed by one shader engine in comparison to other shader engines. For example, the tessellation factor is greater for patches that appear closer on the display screen than the patches that appear further on the display screen.

Because tessellation occurs after patches are distributed to shader engines, the shader engines become unbalanced pre-tessellation. This causes one shader engine to process thousands of primitives, while other shader engines remain idle.

BRIEF SUMMARY OF EMBODIMENTS

Therefore, what is needed are systems and methods to balance a number of primitives processed by shader engines pre-tessellation.

A system, method and a computer-readable medium embodying some aspects of the present invention for load balancing patch processing pre tessellation are provided. The patches for drawing objects on a display screen are distributed to shader engines for parallel processing. Each shader engine generates tessellation factors for a patch. The value of the generated tessellation factors for the patch is unknown prior to distribution. The patches are redistributed to the shader engines pre-tessellation to load balance the shader engines for processing the patches based on the value of tessellation factors in each patch.

Further features and advantages of the embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the embodiments and, together with the description, further serve to explain the principles of the embodiments and to enable a person skilled in the pertinent art to make and use the embodiments. Various embodiments are described below with reference to the drawings, wherein like reference numerals are used to refer to like elements throughout.

FIG. 4 is a diagram of a high tessellation quad patch that is divided into sub patches in a shape of a "donut," according to an embodiment.

The invention will be described with reference to the accompanying drawings. Generally, the drawing in which an element first appears is typically indicated by the leftmost digit(s) in the corresponding reference number.

DETAILED DESCRIPTION OF EMBODIMENTS

Figure 1A:
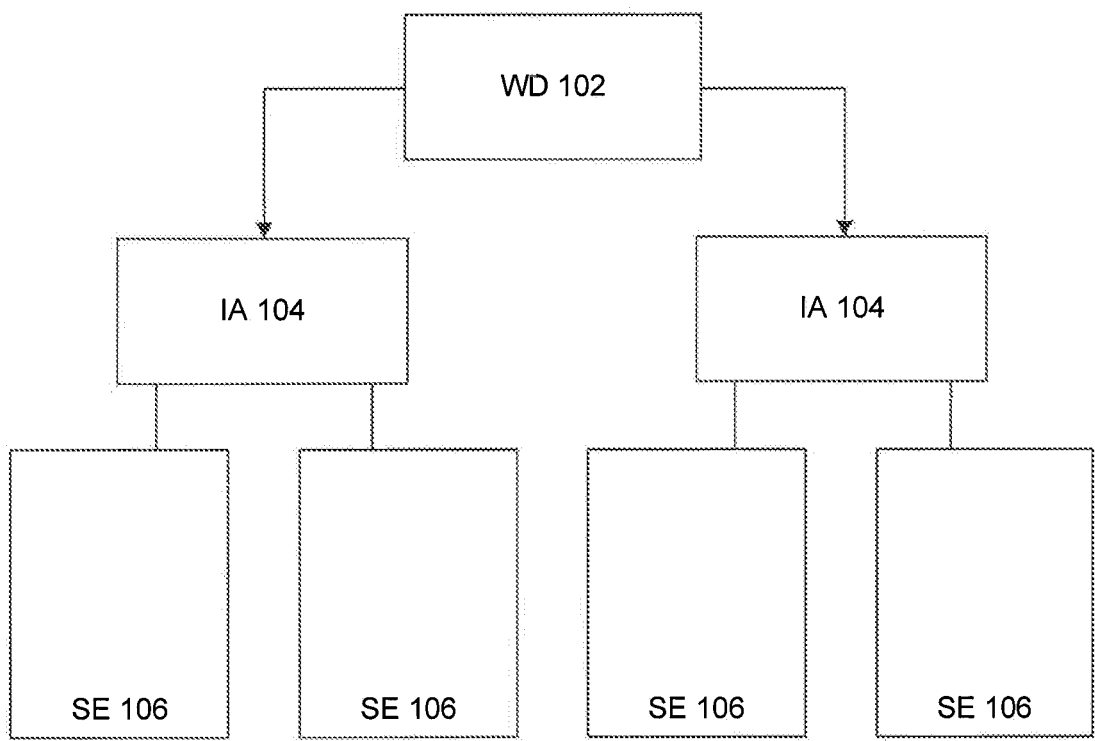
FIG. 1A is a block diagram of a graphics pipeline, according to an embodiment.

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments of the invention" does not require that all embodiments of the invention include the discussed feature, advantage or mode of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting of the invention. For example, as used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

A graphics pipeline is included in a graphics processing unit (also referred to as a GPU). A GPU is a specialized electronic circuit designed to rapidly build and render images on an electronic device. A GPU is used to process graphics on electronic devices, such as mobile phones, personal computers, workstations, game consoles, as well as within embedded systems on the electronic devices. A GPU has a highly parallel structure that is efficient for processing large blocks of data, such as data included in computer graphics applications, images and videos, in parallel. Mathematical data, particularly matrix data, also benefits from GPU processing because many matrix manipulations are performed in parallel. A GPU may form part of a larger processing unit which may include a central (or host) processing unit. In the art, such a combined processing unit may be referred to as an applications processor, an accelerated processing unit or, simply, a processor.

To process data efficiently, GPUs include hardware pipelines. Hardware pipelines are programmed to processing data of a particular type or perform a particular type of a function. A graphics pipeline is programmed to process and render computer graphics, images, video, etc. As described above, each image or a frame in a video is rendered using primitives that include points, lines, polygons or a combination of primitives that are organized into a mesh. The primitives in each frame or image are drawn individually by determining which pixels fall within the edges of the primitives and calculating the attributes of the primitive that corresponds to each of those pixels.

1. Exemplary System

FIG. 1A is a block diagram 100A of a graphics pipeline, according to an embodiment. A graphics pipeline includes a work distributor 102 (also referred to as WD 102), input assemblers 104 (also referred to as IAs 104) and shader engines 106 (also referred to as SEs 106).

In an embodiment, WD 102 distributes the work to other components in a graphics pipeline for parallel processing. WD 102 receives patches from a driver that include instructions for rendering primitives on a display screen. The driver receives patches from a graphics application. Once the driver receives patches from the graphics application, it uses a communication interface, such as a communication bus, to transmit patches to a graphics pipeline that begins with WD 102. In an embodiment, WD 102 divides patches into multiple work groups that are processed in parallel using multiple SEs 106.

In an embodiment, to transmit work groups to SEs 106, WD 102 passes work groups to IAs 104. In an embodiment, there may be multiple IAs 104 connected to WD 102. IAs 104 divide workgroups into primitive group (also referred to as "prim groups"). IA 104 then passes the prim groups to SEs 106. In an embodiment, each IA 104 is coupled to two SEs 106. IAs 104 may also retrieve data that is manipulated using instructions in the patches, and performs other functions that prepare patches for processing using SEs 106.

In another embodiment, WD 102 may distribute prim groups directly to SEs 106. In this embodiment, the functionality of IA 104 may be included in WD 102 or in SE 106. In this case, WD 102 divides a draw call into multiple prim groups and passes a prim group to SE 106 for processing. This configuration allows WD 102 to scale the number of prim groups to the number of SEs 106 that are included in the graphics pipeline.

In an embodiment, SEs 106 process prim groups. For example, SEs 106 use multiple compute units to manipulate the data in each prim group so that it is displayed as objects on a display screen.

As part of a prim group processing, SEs 106 generate primitives from each prim group. In the graphics pipeline, SEs 106 determine the number of primitives during the tessellation process. In the tessellation process each prim group is broken down into multiple triangles, points or lines. The triangles, points or lines form a mesh that represents an object on the display screen. The number of triangles, points or lines may be a function of how close or far an object is being displayed on the display screen. For example, an object that is displayed far away is represented by a fewer triangles, points or lines than the object that appears closer or zoomed in on the display screen.

In a conventional graphics pipeline, tessellation process occurs after prim groups are distributed to the SEs. Because the tessellation process in each SE generates a different number of primitives, SEs in a conventional graphics pipeline become unbalanced. In extreme cases, some conventional SEs may remain idle while waiting for other SEs to complete primitive processing.

Figure 1B:
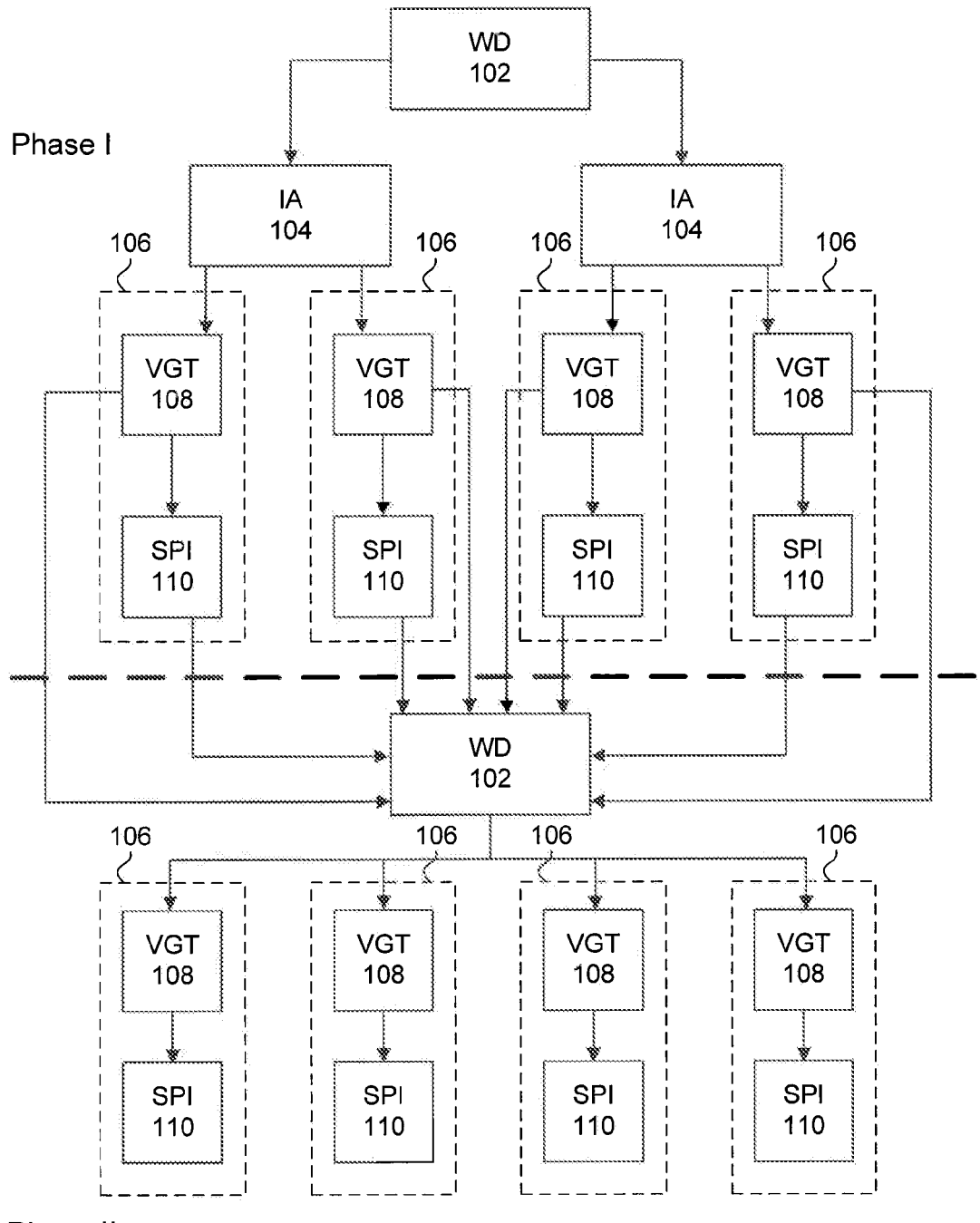
FIG. 1B is a block diagram of a graphics pipeline that rebalances patches pre-tessellation, according to an embodiment.

FIG. 1B is a block diagram 100B of a graphics pipeline that rebalances patches pre-tessellation, according to an embodiment. The graphics pipeline in block diagram 100B uses WD 102 to redistribute patches pre-tessellation process. The graphics pipeline in block diagram 100B includes two phases, phase I and phase II. In phase I, WD 102 distributes prim groups to SEs 106 for processing. In phase II, the prim groups are returned to WD 102 for redistribution pre-tessellation, load balancing prior to further processing on SEs 106.

In an embodiment, in phase I, WD 102 distributes patches to SEs 106. When WD 102 receives patches from a driver, it divides patches into work groups. IA 104 then divides each work groups into prim groups. A work group may be twice the size of a prim group, in one embodiment. WD 102 then transmits workgroups to IAs 104.

In an embodiment, the number of patches in a prim group may be configured using registers. In an embodiment, prim groups are approximately the same size, such that each SE 106 processes approximately the same number of prim groups.

In an embodiment, after IA 104 divides work groups into prim groups, it sends prim groups to VGT 108 on SE 106 for processing. In an embodiment, IA 104 may distribute prim groups to as many SEs 106 as the number of SEs 106 coupled to each IA 104. In another embodiment, IA 104 divides a workgroup into two prim groups, and sends each prim group to VGT 108 in SE 106.

In an embodiment, VGT 108 further groups patches in a prim group into units of work called thread groups. In one embodiment, each prim group includes an exact multiple of thread groups. In another embodiment, there is a 1:1 ratio between thread groups and prim groups.

In a Direct 3D ("D3D") environment, the number of patches that are grouped into a thread group may be configured using registers.

In an embodiment, VGTs 108 begin processing each thread group from a prim group that it receives from IA 104. VGTs 108 divide thread groups into wave fronts (also referred to as "waves"), where each wave front includes a number of threads that are processed in parallel. VGT 108 then launches the waves to other components in SEs 106, such as SPI 110 and compute units, as described in detail in FIG. 2. SPI 110 associates waves or waves with different shader programs. A person skilled in the art will appreciate that a shader program is written by an application developer, in, for example, OpenGL or D3D. The shader program provides instructions to a compute unit for processing waves on a per element basis. Example shader programs are a local shader, a hull shader, and a domain shader. A local shader manipulates a position, texture coordinates, and color of each vertex in a triangle. A hull shader computes color and attributes, such as light, shadows, specular highlights, translucency, etc., for each output control point of the patch. A domain shader manipulates the surface geometry of the objects that are comprised of multiple triangles on the display screen. SPI 110 is coupled to compute units that process the wave using the associated shader. Compute units include arithmetic logic units (ALU's) that manipulate waves based on instructions provided in the shader programs.

Example processing of waves in phase I and phase II is described in detail below with reference to FIGS. 2-5.

Figure 2:
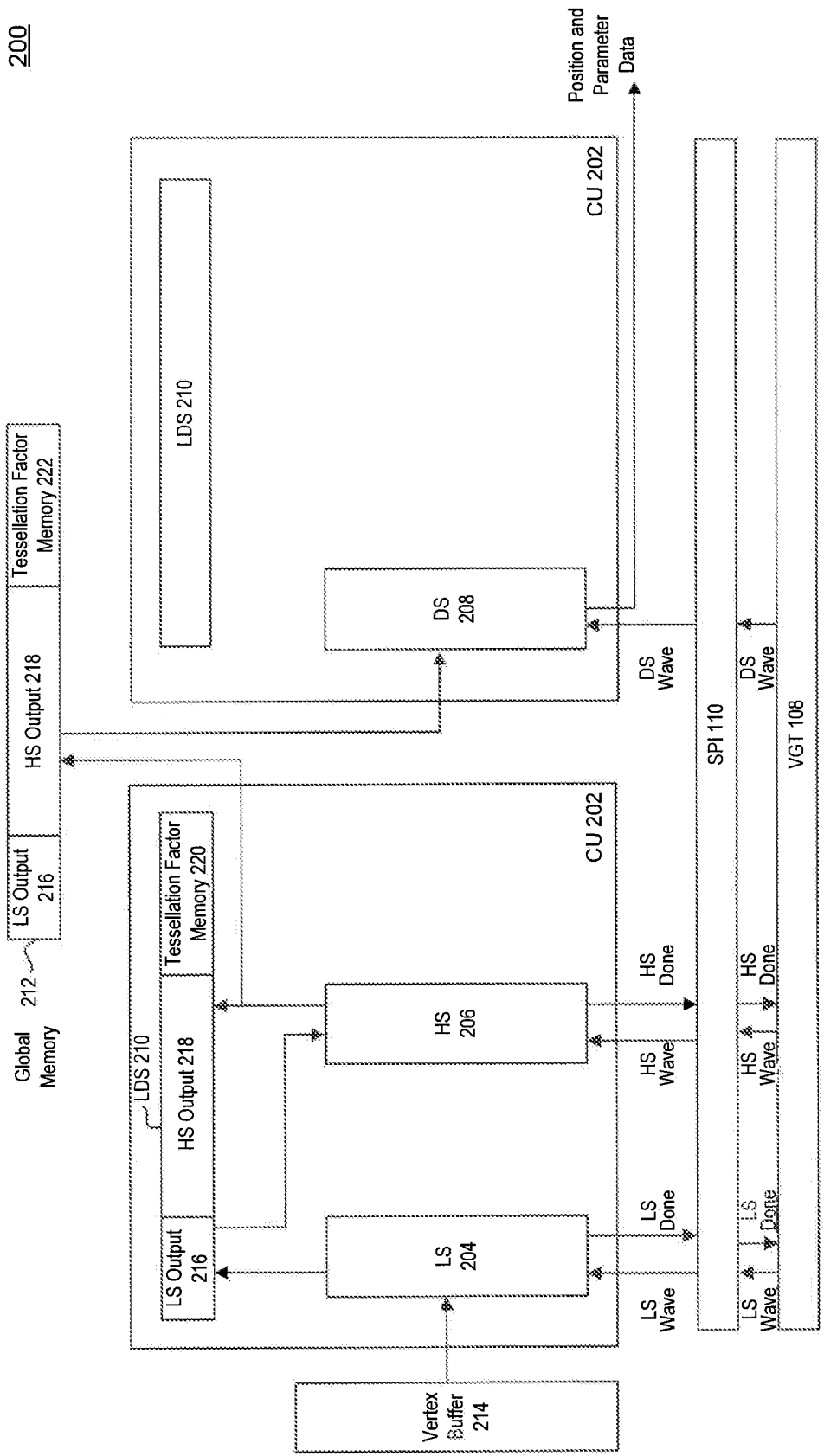
FIG. 2 is a block diagram of an exemplary embodiment the thread group being processed in a shader engine.

FIG. 2 is a block diagram 200 of an exemplary embodiment of the thread group being processed in a shader engine. For example, block diagram 200 supports patch processing in phase I and phase II in block diagram 100B.

Block diagram 200 includes one or more VGTs 108, an SPI 110, a compute unit 202 (also referred to as CUs 202), a local shader 204 (also referred to as LS 204), a hull shader 206 (also referred to as HS 206), a domain shader 208 (also referred to as DS 208), a local data store memory 210 (also referred to as LDS 210), an off chip memory 212, and a vertex buffer 214.

In an embodiment, VGT 108 generates waves for each thread group and launches the waves to SPI 110. For example, VGT 108 generates an LS wave for each thread group. LS waves are components in a thread group that are processed by CU 202. SPI 100 associates the LS wave with LS 204 for processing on CU 202.

In an embodiment, VGT 108 inserts an event, such as a flush event, after it launches all LS waves in the thread group. The flush event may indicate to VGT 108 that CU 202 completed processing all LS waves in a thread group.

In an embodiment, when SPI 110 receives an LS wave from VGT 108, SPI 110 associates the LS wave with LS 204. LS 204 fetches the patch data associated with the LS wave from on chip or off chip memory, or a memory buffer, described below. For example, at this point in a graphics pipeline each patch is a set of control points. Each control point is associated with patch data that includes attributes such as a position, texture coordinates, and color. In an embodiment, LS 204 then fetches the attributes for each control point from vertex buffer 214. Vertex buffer 214 is a temporary memory storage that stores attributes associated with control points included in LS wave. A person skilled in the art will appreciate that a temporary memory storage may include volatile memory storage that temporarily stores data. Volatile memory typically stores data as long as electronic device receives power, and may lose its memory state when the power is lost. A person skilled in the art will further appreciate that attributes stored in vertex buffer 214 may be from the memory storage.

In an embodiment, once the data is fetched from vertex buffer 214, CU 202 executes LS 204 once for each control point in the patch. In one example, each patch may include between 1 and 32 control points.

In an example, SPI 110 also allocates memory space in LDS 210 and global memory 212 for a thread group. LDS 210 is an on-chip memory that may be built into CU 202. Global memory 212 is a memory storage located outside of a GPU chip and is an off-chip memory. In some embodiments, global memory 212 may also be an on-chip memory as well. LDS 210 and global memory 212 may include volatile and non-volatile memory for storing data. Example volatile memory includes a random access memory (RAM). Volatile memory typically stores data as long as electronic device receives power, as described above. Example non-volatile memory includes read-only memory, flash memory, ferroelectric RAM (F-RAM), hard disks, floppy disks, magnetic tape, optical discs, etc. Non-volatile memory retains its memory state when the electronic device loses power or is turned off. In an embodiment, data in the non-volatile memory may be copied to the volatile memory prior to being accessed by the components in a graphics pipeline.

In an embodiment, SPI 110 allocates space in LDS 210 to store LS output 216 and HS output 218.

In an embodiment, SPI 110 is coupled to CU 202. CU 202 processes wave fronts using an associated shader. For example, SPI 110 sends an LS wave to CU 202 for processing using LS 204. During processing, CU 202 retrieves control point attributes for the control points that are included in LS wave from vertex buffer 214 and uses LS 204 to manipulate the control point attributes.

In an embodiment, once LS 204 uses CU 202 to manipulate the attributes associated with control points in the LS wave, LS 204 writes the manipulated LS data to LDS 210 as LDS output 216. At this point in graphics pipeline, the number of control points in each patch remains the same, although the control points may have different values.

In an embodiment, LS 204 may also store LS output 216 to global memory 212.

In an embodiment, when CU 202 completes processing LS waves it sends a signal to SPI 110. SPI 110 then transmits the signal to VGT 108. In an embodiment, SPI 110 sends the signal to VGT 108 for each thread group, such as when all LS waves in a thread group complete processing using CU 202.

As with LS waves, VGT 108 launches HS waves to SPI 110. In an embodiment, VGT 108 may insert an event when it launches HS waves associated with a thread group to SPI 110.

In an embodiment, HS 206 transforms an input patch in the thread group into an HS output patch. In an HS output patch the number of control points and the value of control points may be different. CU 202 stores the HS data generated using the HS wave as HS output 218 in LDS 210. Additionally, HS 206 determines the value of tessellation factors for each patch. For example, HS 206 determines the screen space required to display a patch. The patch that is closer to a viewer requires more tessellation than the patch that is further away from a viewer. Moreover, the value of tessellation factors is proportional to the number of primitives that are generated for each patch. For example, the higher the value of tessellation factors the more primitives are generated for the patch. A person skilled in the art will appreciate that the viewer is a point in space with respect to which object appear on the display screen. In an embodiment, tessellation factors generated using each HS wave are stored in tessellation factor memory 220.

In an embodiment, the number of tessellation factors depends on a type of a patch. For example, for a quad patch HS 206 computes six tessellation factors. The tessellation factors are used to determine how the quad patch may be divided into multiple triangles that form a mesh. A person skilled in the art will appreciate that a mesh defines a three dimensional object in a graphics environment.

In an embodiment, HS 206 generates tessellation factors for each patch having different values. In an embodiment, the values may range from 1 to 64.

In an embodiment, when VGT 108 sends an HS wave to SPI 110, it also sends the thread group information associated with the HS wave to WD 102. In an embodiment, WD 102 uses the thread group information to redistribute work among multiple VGTs 108 after HS 206 generates tessellation factors for each patch.

In an embodiment, CU 202 receives HS waves from SPI 110 and uses HS 206 to generate tessellation factors from patches included in each HS wave. In an embodiment, HS shader 206 includes instructions to write the generated tessellation factors to tessellation factor memory 220 and HS output data to HS output 218 in LDS 210.

In an embodiment, once CU 202 completes processing an HS wave of a thread group, HS 206 may copy the tessellation factors and HS output 218 from LDS 210 to global memory 212. For example, global memory 212 may also store HS output 218. In another example, global memory 212 may also include tessellation factor memory 222 that stores tessellation factors. In an embodiment, global memory 212 may store HS output 218 and tessellation factors for all SEs 106 that process patches for work groups. The HS output 218 and tessellation factors may include the thread group number for WD 102 to identify a thread group and a patch that generated a particular HS output 218 and tessellation factors.

In an embodiment, when CU 202 completes processing on the HS wave, CU 202 sends a signal to SPI 110 that indicates that CU 202 completed processing of all HS waves in a thread group. In an embodiment, SPI 110 also sends a signal to WD 102 that indicates that SPI 110 completed processing of HS waves.

With reference back to FIG. 1B, when WD 102 receives a signal from VGTs 108 that CU 202 completed processing of all HS waves, phase I completes. At this point, the values of tessellation factors for each patch in a thread group has been calculated using HS 206. The tessellation factors and the corresponding HS output 118 are stored in global memory 212, as described above.

In a conventional graphics pipeline, when tessellation factors are generated using SEs, SEs continue to process the thread groups that were distributed to SEs by a WD. SEs continue to process the thread groups even though each SE needs to process different value of tessellation factors which leads to an unbalanced graphics processing system.

Unlike conventional systems, in one embodiment the graphics pipeline in block diagram 100B redistributes thread groups pre-tessellation to rebalance patch processing on SEs 106. In an embodiment, after tessellation factors are generated WD 102 redistributes the patches to different threads groups prior to further processing on the same or different SEs 106. The redistribution is based on the generated tessellation factors. In this way, WD 102 ensures that SEs 106 are load-balanced while processing tessellation factors associated with the patches.

As described above, FIG. 1B depicts Phase II processing of the graphics pipeline, according to an embodiment of the present invention. In FIG. 1B, WD 102 redistributes patches to different prim groups. Once WD 102 redistributes patches to different prim groups, WD 102 transmits the new prim groups to VGTs 108 for processing, as described in detail below.

Figure 3:
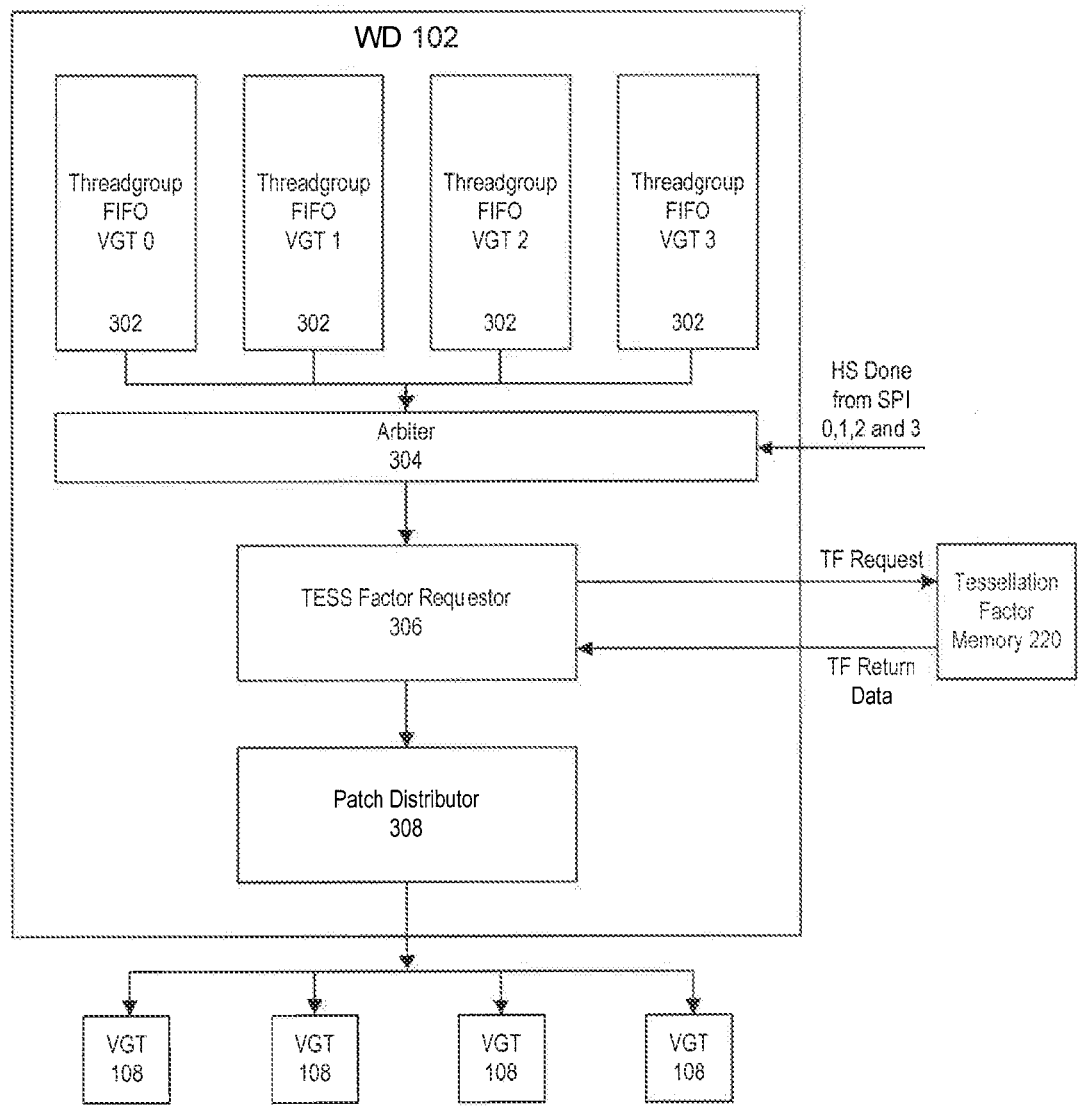
FIG. 3 is a block diagram of a work distributor redistributing patches to different shader engines, according to an embodiment.

FIG. 3 is a block diagram 300 of a work distributor redistributing patches to different shader engines, according to an embodiment. In an embodiment WD 102 redistributes patches to different SEs 106 based on the generated tessellation factors. WD 102 in block diagram 300 includes a thread group queue 302 associated with each VGT 108, an arbiter 304, a tessfactor requester 306, and a patch distributor 308.

In an embodiment, when CU 202 completes processing HS waves using HS 206, CU 202 stores HS output 218 and tessellation factors in memory and routes the thread groups information back to WD 102. Thread group queue 302 on WD 102 stores thread group information associated with each thread group. Example thread group information that VGTs 108 routes to WD 102 includes a number of patches that are included in each thread group, a thread group identifier, location of the tessellation factors in tessellation factor memory 222, etc. In an embodiment, thread group queue 302 stores the thread group information using first-in, first-out (FIFO) methodology. In an embodiment, thread group information also includes information regarding the processing order of each thread group and prim group.

In an embodiment, WD 102 includes thread group queue 302 that corresponds to each VGT 108. For example, if the graphics pipeline includes four VGTs 108 that receive work from WD 102, WD 102 includes four thread group queues 302, where each thread group queue 302 corresponds to a particular VGT 108.

In an embodiment, arbiter 304 receives thread group completion information from SPI 110. For example, SPI 110 associated with each VGT 108 sends a signal to WD 102 when HS 206 completes processing HS waves for each thread group on CU 202. Thus, in an embodiment that includes four SEs 106 that process thread groups, each of the four SPIs 110 may send a signal to WD 102, i.e., one signal per thread group. Arbiter 304 receives the signal from SPI 110 and communicates to WD 102 that HS 206 completed processing the thread group on a particular VGT 108.

In an embodiment, when WD 102 determines that the thread groups on a particular VGT 108 completed processing, WD 102 reads the tessellation factors that are associated with the completed thread group from global memory 212. In an embodiment, WD 102 uses the same order to read thread group information from thread group queue 302, as the order that the thread groups were processed on VGTs 108. For example, if WD 102 assigned thread groups to VGT 0, VGT 1, VGT 2 and VGT 3 (not shown), where the first thread group was assigned to VGT 0, the second thread group was assigned to VGT 1, etc., WD 102 may retrieve thread group information from thread group queue 302 associated with VGT 0, then from thread group queue 302 associated with VGT 1, etc.

In an embodiment, WD 102 determines the order for each thread group using counters associated with each thread group and/or prim group when it is initially routed to IAs 104 and VGTs 108. For example, when WD 102 divides a packet into prim groups, it may tag each prim group with a prim group counter that indicates the issuance order of each prim group in phase I. VGT 108 may then tag each thread group with a thread group counter that identifies the thread group processing order in CU 202.

In an embodiment, when arbiter 304 receives the signal from SPI 110 that the processing of HS waves is complete, WD 102 uses the prim group and thread group counters to ensure that the order that each thread group was launched for processing on SEs 106 is maintained. For example, WD 102 uses the prim group counter and the thread group counter to identify thread group queue 302 from which to retrieve thread group information to redistribute thread groups for phase II processing.

In an embodiment, when WD 102 retrieves thread group information from a particular thread group queue 302, tessfactor requester 306 uses the thread group information to retrieve tessellation factors associated with the patches in the thread group from tessellation factor memory 222. The thread group information includes a number of patches and a type of tessellation factors for each patch. For example, a thread group may include five patches, each patch having a quad tessellation type. A person skilled in the art will appreciate that the quad tessellation type includes six tessellation factors. Therefore, the total number of tessellation factors stored in tessellation factor memory 222 for the five patches is 30. Tessfactor requester 306 then retrieves the 30 tessellation factors associated with the five patches from tessellation factor memory 222.

In an embodiment, based on the tessellation factors in each patch, patch distributor 308 redistributes patches to VGTs 108 for further processing. Patch distributor 308 may include multiple heuristics that it uses to redistribute patches. In one embodiment, path distributor 308 may calculate a number of primitives that may be generated for each patch. In another embodiment, patch distributor 308 determines an estimate of the number of primitives that may be generated for each patch based on the tessellation factors.

In an embodiment, an application developer or a user may set a tessellation factor threshold. The tessellation factor threshold indicates a total value of factors that VGT 108 may process in parallel with other VGTs 108. WD 102 may use the tessellation factor threshold as an upper bound for the total value of tessellation factors in patches that it routes to each VGT 108.

In an embodiment, patch distributor 308 attempts to estimate the number of patches that are sent to each VGT 108 based on the tessellation factors and the tessellation type of each patch. In an embodiment, each tessellation type generates a minimum number of inside tessellation factors that are a subset of all tessellation factors for the patch. Patch distributor 308 then adds the inside tessellation factors for multiple patches until it reaches the tessellation factor threshold. The patches that patch distributor 308 includes in the summation are then sent to a particular VGT 108. This heuristic attempts to ensure that each VGT 108 processes patches that in totality have the value of tessellation factors bounded by the tessellation factor threshold. This ensures that each VGT 108 receives approximately the same amount of work from WD 102.

In another embodiment, a single patch may be a high tessellation factor patch. Example high tessellation factor patch may have a tessellation factor of 64. A high tessellation factor patch may produce work that overwhelms a single VGT 108. A high tessellation patch may include a value of estimated tessellation factors that is greater than the configured tessellation factor threshold.

Figure 4:
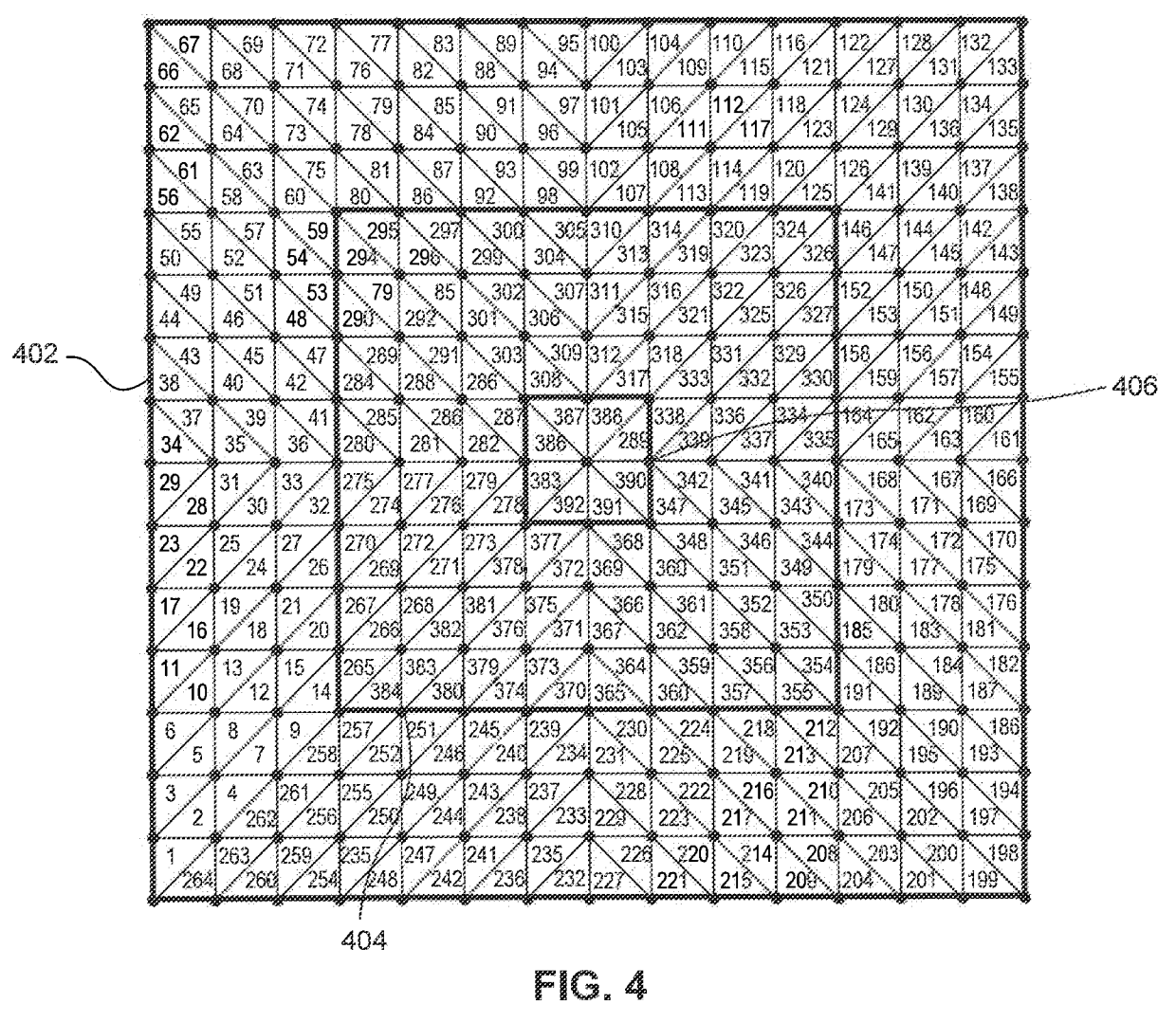

To process the high tessellation factor patch, patch distributor 308 splits the high tessellation factor patch for processing using multiple VGTs 108. For example, a quad patch may be split into a sub-patch in a shape of a "donut" as shown in FIG. 4. The "donut" sub-patch in FIG. 4 includes three sub-patches, labeled as 402, 404 and 406. Patch distributor 308 then sends each sub-patch to a particular VGT 108.

In an embodiment, patch distributor 308 also maintains the order that WD 102 and IAs 104 used to distribute patches to VGTs 108 in phase I. Thus, a patch that was processed subsequent to another patch in phase I will also be processed subsequent to that patch in phase II.

In an embodiment, when patch distributor 308 redistributes patches of a thread group from phase I to a different thread group for phase II, WD 102 sends a signal to VGT 108 that processed the thread group in phase I. The signal indicates that the thread group processing of phase I is complete and VGT 108 can cause SPI 110 to de-allocate the memory space in LDS 210 and off-chip memory 212 for LS output 216 associated with the thread group.

With reference back to FIG. 2, when VGT 108 receives the tessellated patches in phase II, VGT 108 divides the patches into thread groups. VGT 108 then generates the necessary DS wave for each thread group and launches the DS waves to SPI 110.

When SPI 110 receives the DS waves, it associates DS waves with a DS 208. DS 208 generates a surface geometry from the control points generated using HS 206 and the UV coordinates associated with each control point. A person skilled in the art will appreciate that a UV coordinates are two-dimensional (2D) coordinates that are mapped to a 3D model, and range from 0 to 1. The DS wave may then be processed by one or more single instruction multiple data ("SIMD") units in CU 202.

In an embodiment, the input to DS 208 may be control points manipulated using HS 206 and tessellation factors associated with a patch included in a thread group. The control points and tessellation factors may be retrieved from global memory 212.

In an embodiment, SPI 110 manages thread group tessellation information located in global memory 212. In one embodiment, WD 102 includes a counter for each SE 106 in phase I. The counter increments for each tessellation thread group that is issued to the respective SE 106. In phase II, WD 102 passes the counter to VGT 108 for each patch, as part, for example, of the DS wave interface. SPI 110 uses the counter to identify the location in tessellation factor memory 222 located in global memory 212 to retrieve tessellation factors associated with the thread group. SPI 110 also uses the counter to retrieved HS output 218 stored in global memory 212 that is an input to DS 208.

After DS 208 completes processing thread groups, the generated primitives in the thread groups are processed using other components in the graphics pipelines for display on a display screen.

2. Memory Management

In an embodiment, memory space in LDS 210, global memory 212 and tessellation factor memory 220 and 222 require allocation and de-allocation during phase I and phase II processing in the graphics pipeline. For example, SPI 110 on each SE 106 allocates memory space in LDS 210 on each respective SE 106. In an embodiment, SPI 110 allocates memory space for LS output 216 when SPI receives an LS wave from VGT 108. SPI 110 also allocates the memory space for HS output 218 when SPI 110 receives an HS wave from VGT 108. In another embodiment, SPI 110 allocates memory space for LS output 216 and HS output 218 when it receives an LS wave from VGT 108. SPI 110 may de-allocate the memory space allocated for LS output 216 and HS output 218 once CU 202 completes phase I and phase II processing.

Because thread groups are redistributed pre-tessellation, after SE 106 writes LS output 216 and HS output 218 to on-chip LDS 210, SE 106 copies LS output 216 and HS output 218 to global memory 212. As described above, global memory 212 can be a global memory accessible to multiple SEs 106. Once SE 106 copies LS output 216 and HS output 218 to global memory 212, the output is accessible to other SEs 106. This allows SEs 106 to access global memory for LS output 216 and HS output 218 when WD 102 redistributes the patches in phase II.

In an embodiment, VGT 108 also manages tessellation factor memories 220 and 222. Tessellation factor memory may be located within LDS 210 or off-chip memory 212, or a combination of both. In an embodiment, tessellation factor memory may be implemented as a ring buffer. During phase I, SPIs 110 allocate tessellation factor memory 220 in LDS 210. Tessellation factor memory 220 stores tessellation factors generated using HS 206. When phase I completes, tessellation factors stored in tessellation factor memory 220 on LDS 210 are copied to tessellation factor memory 222 located on global memory 212. This allows other SEs 106 to access the tessellation factors associated with patches after the patches are redistributed in phase II. WD 102 then accesses tessellation factor memory 222 to retrieve tessellation factors for each patch during phase II when it redistributes patches to SEs 106 for further processing.

3. Method

Figure 5:
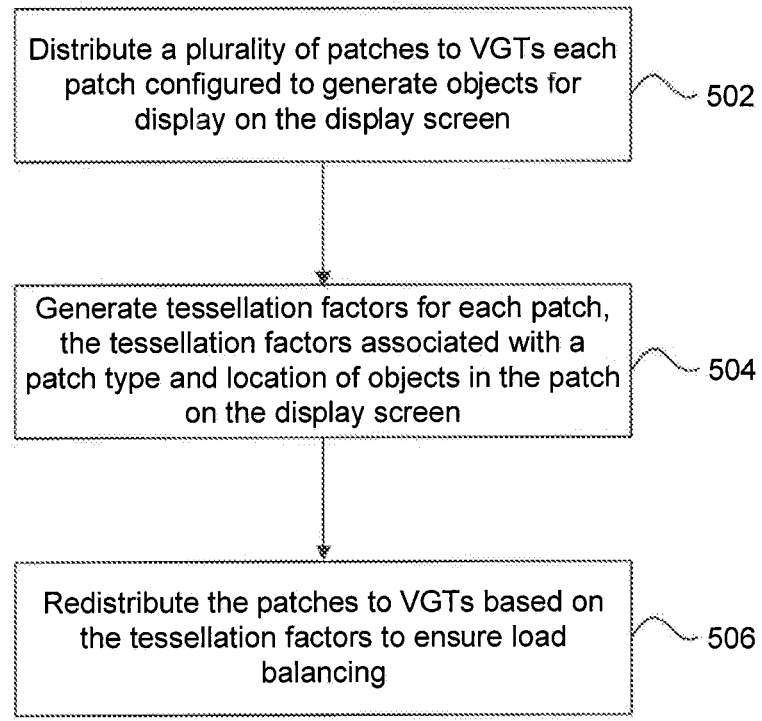
FIG. 5 is a flowchart of a method for redistributing patches pre-tessellation, according to an embodiment.

FIG. 5 is a flowchart of a method 500 for redistributing patches pre-tessellation, according to an embodiment. For example, method 500 may be performed by the systems and element in one or more of FIGS. 1-4. It is to be appreciated that method 500 may not be performed in the order shown, or require all of the operations shown. Merely for convenience, and without limitation, method 500 is described with reference to FIGS. 1-4.

At operation 502, patches are distributed to VGTs. For example, work distributor 102 distributes a plurality of patches to VGTs 108. As described above, work distributor 102 generates work groups from a plurality of patches and transmits the work groups to IAs 104. Each IA 104 then divides the work group into prim groups and transmits the prim groups to VGTs 108 coupled to a respective IA 104. VGTs 108 further divide prim groups into one or more thread groups and processes each thread group using CU 202.

At operation 504, tessellation factors are generated for a patch. During processing, patches in each thread group are manipulated using multiple shaders, such as LS 204 and HS 206. When HS 206 manipulates a patch, it generates tessellation factors for the patch. As described herein, the tessellation factors may depend on a type of a patch, a type of tessellation, and how close or far the object that is generated by the patch is shown on the display screen.

At operation 506, patches are redistributed based on the tessellation factors. For example, once HS 206 generates tessellation factors for a patch, WD 102 redistributes the patches based on the tessellation factors. WD 102 receives thread group information for patches included in the thread group, where the thread group includes tessellation factors for each patch. Based on the tessellation factors WD 102 redistributes the patches in the thread group to VGTs 108 for further processing. In an embodiment, WD 202 redistributes patches based on the methodologies described above. Once redistributed, VGTs 108 generate new thread groups that include redistributed patches and transmits each thread group for processing using DS 208 and display on the display screen.

Embodiments can be accomplished, for example, through the use of general-programming languages (such as C or C++), hardware-description languages (HDL) including Verilog HDL, VHDL, Altera HDL (AHDL) and so on, or other available programming and/or schematic-capture tools (such as circuit-capture tools). The program code can be disposed in any known computer-readable medium including semiconductor, magnetic disk, or optical disk (such as CD-ROM, DVD-ROM). As such, the code can be transmitted over communication networks including the Internet and internets. It is understood that the functions accomplished and/or structure provided by the systems and techniques described above can be represented in a core (such as a CPU core and/or a GPU core) that is embodied in program code and may be transformed to hardware as part of the production of integrated circuits.

In this document, the terms "computer program medium" and "computer-usable medium" are used to generally refer to media such as a removable storage unit or a hard disk drive. Computer program medium and computer-usable medium can also refer to memories, such as system memory and graphics memory which can be memory semiconductors (e.g., DRAMs, etc.). These computer program products are means for providing software to an APD.

The embodiments are also directed to computer program products comprising software stored on any computer-usable medium. Such software, when executed in one or more data processing devices, causes a data processing device(s) to operate as described herein or, as noted above, allows for the synthesis and/or manufacture of computing devices (e.g., ASICs, or processors) to perform embodiments described herein. Embodiments employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nano-technological storage devices, etc.), and communication mediums (e.g., wired and wireless communications networks, local area networks, wide area networks, intranets, etc.).

It is to be appreciated that the Detailed Description section, and not the Summary and Abstract sections, is intended to be used to interpret the claims. The Summary and Abstract sections may set forth one or more but not all exemplary embodiments as contemplated by the inventor(s), and thus, are not intended to limit the embodiments and the appended claims in any way.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the embodiments should not be limited by any of the above-described exemplary embodiments, but should be defined only in accordance with the following claims and their equivalents.

What is claimed is:

1. A system comprising:
 a work distributor configured to:
  distribute patches to shader engines pre-tessellation;
  retrieve tessellation factors for the patches generated using the shader engines;
  at least one of combine and divide the patches for processing on the shader engines based on a value of tessellation factors in the patches per thread; and
  redistribute at least one of combined and divided patches to the shader engines post-tessellation to load balance the shader engines.

2. The system of claim 1, wherein the work distributor is further configured to:

distribute the patches configured to draw objects on a display screen to the shader engines configured to process the patches in parallel, each of the shader engines configured to generate the tessellation factors for the patch, wherein the value of the generated tessellation factors for the patch is unknown prior to distribution.

3. The system of claim 1, wherein each of the shader engines is further configured to:
generate the tessellation factors for the patches in one or more thread groups; and
store the tessellation factors in a memory accessible to the work distributor for redistribution of the patches in the one or more thread groups in the shader engines based on the generated tessellation factors in the patch.

4. The system of claim 3, wherein to perform the redistributing of the patches the work distributor is further configured to:
retrieve thread group information for each thread group in the one or more thread groups processed on the shader engine, the thread group information including tessellation information for the patches in each thread group; and
determine the value of tessellation factors associated with the patch based on the thread group information.

5. The system of claim 4, wherein the work distributor is further configured to combine the patches until the value of tessellation factors in the combined patches reaches a tessellation factor threshold.

6. The system of claim 4, wherein to combine the patches the work distributor is further configured to estimate a number of primitives generated by the tessellation factors for the patch based on at least a tessellation type and the value of tessellation factors.

7. The system of claim 4, wherein the shader engine is further configured to:
receive the combined patches from the work distributor subsequent to the redistribution; and
process the combined patches, wherein the shader engine that generated tessellation factors for the combined patches is different from the shader engine that processes the combined patches subsequent to the redistribution.

8. The system of claim 3, wherein the redistributing of the divided patches of the at least one of combined and divided patches, the work distributor is further configured to:
retrieve a thread group information for a thread group in the one or more thread groups processed on the shader engines, the thread group information including tessellation information for the patches in the thread group; and
for each patch:
determine if the value of tessellation factors associated with the patch based on the thread group information is higher than the tessellation factor threshold;
dividing the patch into a plurality of sub-patches based on a tessellation type associated with the patch based on the determining; and
distribute the plurality of sub-patches to the shader engines for parallel processing.

9. The system of claim 1, wherein the work distributor is configured to maintain the patch processing order of the patches and combined patches, respectively, on the shader engines before and after distributing and redistributing the patches and combined patches, respectively, to the shader engines.

10. A method comprising:
distributing patches to shader engines pre-tessellation;
retrieving tessellation factors for the patches generated using the shader engines;
combining the patches for processing on the shader engines based on a value of tessellation factors in the patches per thread; and
redistributing the combined patches to the shader engines post-tessellation to load balance the shader engines.

11. The method of claim 10, further comprising:
distributing the patches for drawing objects on a display screen to the shader engines for parallel processing, each of the shader engines generating the tessellation factors for the patch, wherein the value of the generated tessellation factors for the patch is unknown prior to distribution.

12. The method of claim 10, further comprising:
generating the tessellation factors for the patches in one or more thread groups; and
storing the tessellation factors in a memory accessible to a work distributor for redistribution of the patches in the one or more thread groups in the shader engines based on the generated tessellation factors in the patch.

13. The method of claim 12, wherein the redistributing patches further comprises:
retrieving a thread group information for each thread group in the one or more thread groups processed on a shader engine, the thread group information including tessellation information for the patches in each thread group; and
determining the value of tessellation factors associated with the patch based on the thread group information.

14. The method of claim 13, wherein the combining further comprises combining patches until the value of tessellation factors in the combined patches reaches a tessellation factor threshold.

15. The method of claim 13, wherein the combining further comprises estimating a number of primitives generated by the tessellation factors for the patch based on at least a tessellation type and the value of tessellation factors.

16. The method of claim 13, further comprising:
receiving the combined patches from a work distributor subsequent to the redistribution; and
processing the combined patches, wherein the shader engine that generated tessellation factors for the combined patches is different from the shader engine that processes the combined patches subsequent to the redistribution.

17. The method of claim 13, wherein the redistributing further comprises:
retrieving a thread group information for a thread group in the one or more thread groups processed on the shader engines, the thread group information including tessellation information for the patches in the thread group; and
for each patch:
determining if the value of tessellation factors associated with the patch based on the thread group information is higher than the tessellation factor threshold;
dividing the patch into a plurality of sub-patches based on a tessellation type associated with the patch based on the determination; and
distributing the plurality of sub-patches to the shader engines for parallel processing.

18. The method of claim 10, further comprising:
maintaining the patch processing order of the patches and combined patches, respectively, on the shader engines before and after distributing and redistributing the patches and combined patches, respectively, to the shader engines.

19. A non-transitory computer-readable storage medium having instructions stored thereon, execution of which by a processor cause the processor to perform the instructions comprising:
   distributing patches to shader engines pre-tessellation;
   retrieving tessellation factors for the patches generated using the shader engines;
   combine the patches for processing on the shader engines based on a value of tessellation factors in the patches per thread; and
   redistributing the combined patches to the shader engines post-tessellation to load balance the shader engines.

20. The computer-readable storage medium of claim 19, further comprising instructions that cause the processor to perform the operations comprising:
   distributing the patches for drawing objects on a display screen to the shader engines for parallel processing, each of the shader engines generating the tessellation factors for the patch, wherein the value of the generated tessellation factors for the patch is unknown prior to distribution.

21. The computer-readable storage medium of claim 19, further comprising instructions that cause the processor to perform the operations comprising:
   generating the tessellation factors for the patches in one or more thread groups; and
   storing the tessellation factors in a memory accessible to a work distributor for redistribution of the patches in the one or more thread groups in the shader engines based on the generated tessellation factors in the patch.

22. The computer-readable storage medium of claim 21, further comprising instructions that cause the processor to perform the operations for redistributing patches, the operations comprising:
   retrieving a thread group information for each thread group in the one or more thread groups processed on a shader engine, the thread group information including tessellation information for the patches in each thread group; and
   determining the value of tessellation factors associated with the patch based on the thread group information.

23. The computer-readable storage medium of claim 19, further comprising instructions configured to perform the operations comprising:
   maintaining the patch processing order of the patches and combined patches, respectively, on the shader engines before and after distributing and redistributing the patches and combined patches, respectively, to the shader engines.

* * * * *